(12) United States Patent
Cohen

(10) Patent No.: US 12,477,173 B1
(45) Date of Patent: Nov. 18, 2025

(54) SYSTEM AND METHOD FOR UNIFYING MEDIA CONTENT TO FACILITATE OFFLINE PLAYBACK

(71) Applicant: Computer Smarts, Inc., Beverly Hills, CA (US)

(72) Inventor: Eric Cohen, Wichita, KS (US)

(73) Assignee: Video Valet Solutions, Inc., Beverly Hills, CA (US)

( * ) Notice: Subject to any disclaimer, the term of this patent is extended or adjusted under 35 U.S.C. 154(b) by 0 days.

(21) Appl. No.: 18/300,134

(22) Filed: Apr. 13, 2023

Related U.S. Application Data

(63) Continuation of application No. 17/384,728, filed on Jul. 24, 2021, now abandoned, which is a continuation-in-part of application No. 16/994,561, filed on Aug. 15, 2020, now abandoned.

(60) Provisional application No. 62/888,292, filed on Aug. 16, 2019.

(51) Int. Cl.
*H04N 21/433* (2011.01)
*H04N 21/43* (2011.01)
*H04N 21/462* (2011.01)

(52) U.S. Cl.
CPC ....... *H04N 21/433* (2013.01); *H04N 21/4302* (2013.01); *H04N 21/4622* (2013.01)

(58) Field of Classification Search
CPC ............ H04N 21/433; H04N 21/4302; H04N 21/4622
See application file for complete search history.

(56) References Cited

U.S. PATENT DOCUMENTS

| | | | |
|---|---|---|---|
| 6,674,796 B1 * | 1/2004 | Haskell | H04N 21/2365 375/E7.134 |
| 8,624,960 B2 * | 1/2014 | Unkel | H04N 13/337 348/51 |
| 11,388,467 B1 * | 7/2022 | Schweinfurth | H04N 21/42203 |
| 2013/0159126 A1 * | 6/2013 | Elkady | H04L 67/10 705/26.1 |
| 2014/0365608 A1 * | 12/2014 | Kiilerich | G06F 16/60 709/217 |
| 2017/0180780 A1 * | 6/2017 | Jeffries | H04N 21/43072 |
| 2017/0332115 A1 * | 11/2017 | Zhong | H04N 21/64 |

* cited by examiner

*Primary Examiner* — Phung-Hoang J Nguyen
(74) *Attorney, Agent, or Firm* — Hanrahan Law Firm, P.A.; Benjamin M. Hanrahan, Esq.

(57) ABSTRACT

A system and method for unifying media content to facilitate offline playback is disclosed herein. More in particular, an administrative computing device is used to obtain a plurality of media content files from a plurality of different media sources or media subscription services. The media content files are then remotely transmitted and synchronized to an on-site computing device, where the media content can be played and displayed on one or more display devices independent of any network connectivity.

14 Claims, 11 Drawing Sheets

30

30

30

SYSTEM AND METHOD FOR UNIFYING MEDIA CONTENT TO FACILITATE OFFLINE PLAYBACK

CLAIM OF PRIORITY/CROSS-REFERENCE TO RELATED APPLICATION

The present application is a Continuation Patent Application of previously-filed, currently-pending U.S. patent application Ser. No. 17/384,728 filed on Jul. 24, 2021, which is a Continuation-In-Part (CIP) Patent Application of previously-filed U.S. patent application Ser. No. 16/994,561 filed on Aug. 15, 2020, which is based on and claims priority under 35 U.S.C. § 119(e) to Provisional Patent Application No. 62/888,292, filed on Aug. 16, 2019.

The contents of all of the above-referenced prior applications, namely, U.S. patent application Ser. No. 17/384,728 filed on Jul. 24, 2021, U.S. patent application Ser. No. 16/994,561 filed on Aug. 15, 2020 and Provisional Patent Application No. 62/888,292 filed on Aug. 16, 2019, are incorporated herein in their entirety by reference.

FIELD OF THE INVENTION

The present invention is generally directed to playback of media content on user devices, and more specifically to a system and method for unifying media content to facilitate offline playback on plurality of user devices and/or display screens, such as tablet computers, virtual reality headsets, monitors, televisions, etc.

BACKGROUND OF THE INVENTION

High quality offline media playback is often desired in environments where network connectivity may be limited or non-existent, such as, for example, during private and/or commercial flight travel. Accordingly, there is a need in the art for a system and method that is capable of aggregating and unifying various media content, and synchronizing the media content with a plurality of or a fleet of user devices, such as tablet computers, virtual reality headsets, etc. The aggregated, unified and synchronized media content can include, but is not limited to movies, documentaries, docuseries, television shows, sporting events, music, games, animations, and other forms of media-based entertainment.

SUMMARY OF THE INVENTION

Accordingly. the system and method of at least one embodiment of the present invention is designed to operate with an off-site admin management computer that the administrator or other user operates in order to aggregate content from a plurality of independent media providers, convert media into optimal formats, sync to an on-site media host computer, and remotely update the unified media library stored on the on-site host computer. The administrator or other operator can then configure individual media syncing preferences for the client device.

In some embodiments, the client devices when not in use are stored in a custom-manufactured dock that provides charging and syncing capabilities. The fleet of client tablet and headset devices allows for media customization according to specific client requests, and every device is equipped with accessories to optimize and personalize the mobile entertainment experience.

In other embodiments, the host device includes connection capabilities (e.g., wired and/or wireless) to one or more display devices, such as, but not limited to one or more monitors, televisions, video projectors, etc.

Furthermore, the client may be provided with their own online or network-accessible portal where they can indicate media preferences at varying levels of detail: from broad genre preferences down to specific TV season episode favorites. The media managed by the system is licensed content purchased from various media vendors, unified into a single functional library that allows seamless synchronization and streamlined management. The system is device and software independent yet has been tailored for the software and hardware notated above. It can be configured on a variety of computers, mobile client tablet devices, client virtual reality headsets, physical syncing stations, and software packages. The client devices are designed to provide an effortless and enjoyable mobile viewing experience in a variety of applications, most notably travel.

These and other objects, features and advantages of the present invention will become more apparent when the drawings as well as the detailed description are taken into consideration.

BRIEF DESCRIPTION OF THE DRAWINGS

Like reference numerals refer to like parts throughout the several views of the drawings provided herein.

DETAILED DESCRIPTION OF THE INVENTION

Figure 1A:
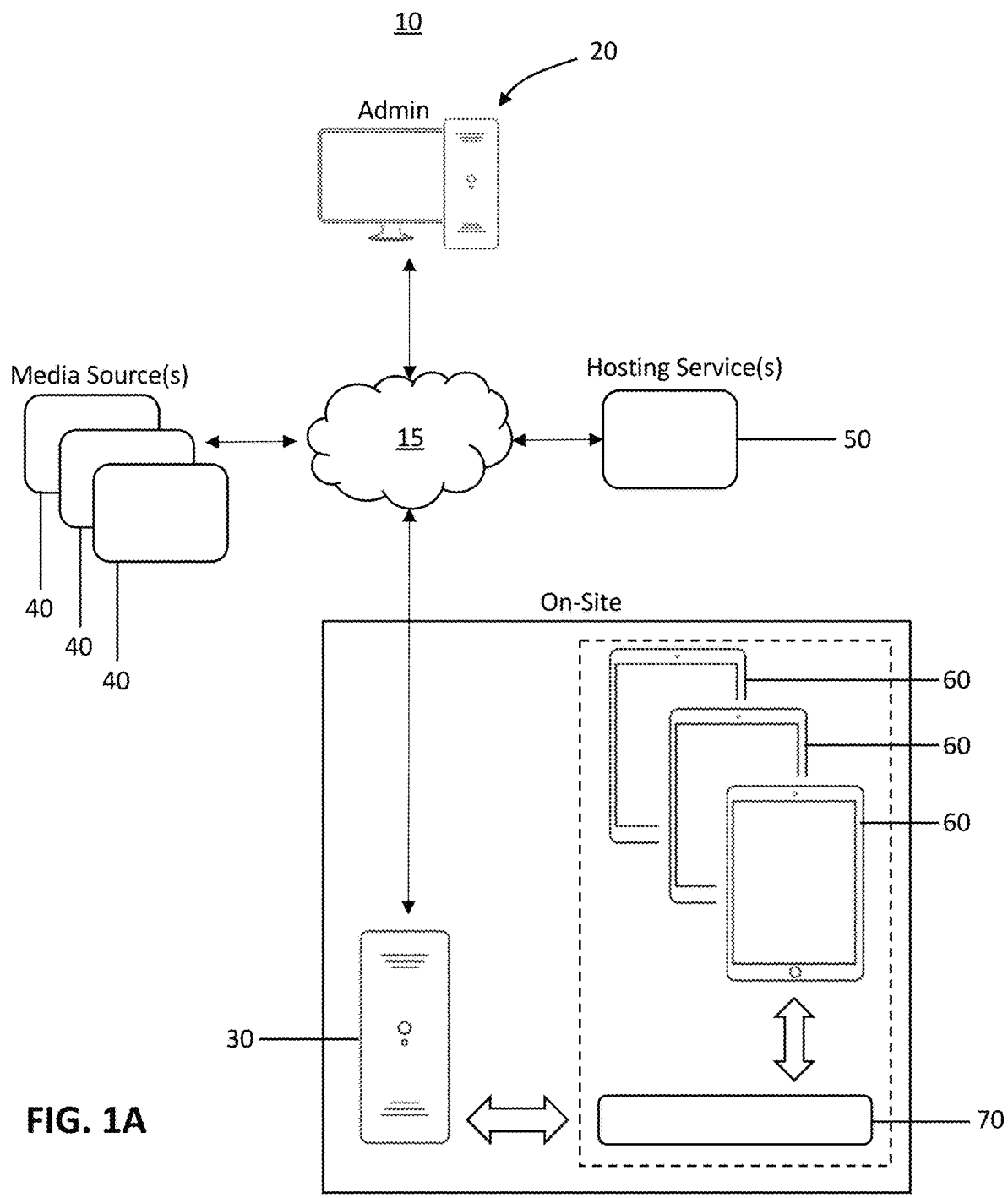
FIG. 1A is a schematic diagram of the system as disclosed in accordance with at least one embodiment of the present invention.

As shown in the accompanying drawings, the present invention is generally directed to a system 10 (FIGS. 1A, 1B, 1C and 1D) and method 100 (FIGS. 2A and 2B) for unifying media content to facilitate offline media playback and/or viewing.

In particular, FIGS. 1A, 1B, 1C and 1D are schematics representing a number of exemplary embodiments or environments in which the system 10 of the present invention can be implemented and operated.

For instance, the system 10 of at least one embodiment includes an off-site or remote management or administrative device 20 communicative with an on-site or host device 30 via one or more networks 15. The network 15, as used herein, can include virtually any data or other communication network within the full spirit and scope of the present invention, including, but in no way limited to computer networks, the Internet, global telex networks, data or TCP/IP networks, such as Wide Area Networks (WAN), Metropolitan Area Networks (MAN), Local Area Networks (LAN), Internet Area Networks (IAN), telecommunication networks, including for example, wireless mobile telecommunications technology (e.g., third generation or 3G networks, fourth generation or 4G networks, fifth generation or 5G networks, long-term evolution or LTE networks), etc.

Furthermore, the management or administrative device 20 of at least one embodiment described herein can include a computer based device, such as, but not limited to a server, desktop computer, mobile computer or laptop, tablet computer, mobile device or smartphone, etc. Similarly, the on-site device 30 of at least one embodiment can include a computer based device, such as, but not limited to a server, desktop computer, mobile computer or laptop, tablet computer, mobile device or smartphone, etc. In this manner, the management system 20 and the on-site device 30 of at least one embodiment each includes a processor, memory, a data storage device, and one or more communication modules.

Specifically, as used herein, the processor of the management device 20 and on-site device 30 includes any device cooperatively structured to execute or implement computer instructions, software, etc., including, for example, the various features and components as described in accordance with at least one embodiment of the present invention. The memory device, as used herein, may include but is not limited to random access memory (RAM) or other like devices configured to implement the present invention in the intended manner, for example, by storing and assisting with the execution of one or more applications, modules, or components capable of implementing the features as described herein. In some cases, the processor and memory can be combined to a single microcontroller as is known in the art. Further, the data storage device, as used herein, may include a hard disk drive, solid state drive, virtual drive, could-based storage drive, or other types of volatile or non-volatile memory. It should be noted that non-transitory computer readable media includes all computer-readable media except for a transitory, propagating signal.

Still referring to FIGS. 1A-1D, in some embodiments, the administrative device 20 and/or on-site host device 30 may be communicative with one or more media sources 40 and/or hosting services 50. For instance, the media source(s) 40 may include online or Internet-based subscription services that provide media content (e.g., movies, television shows, documentaries, etc.) to registered users or account holders. As just an example, the media source(s) 40 may be a media subscription source where the client has a paid subscription, such as, for example, Netflix, HBO Max, Hulu, iTunes, Amazon Prime Video, etc. In some cases, these media sources 40 allow for some media content to be downloaded to a device for offline viewing. The hosting service(s) 50, as used herein, include services, such as could-based or Internet-based services that provide an amount of remote storage where media (and other) files or content can be saved, stored, and subsequently remotely accessed. As just an example, hosting services may include, but are not limited to Dropbox, Google Drive, etc. As shown, for example, in Figured 1C and 1D, in some embodiments of the system 10, hosting service(s) may not be needed.

As described herein, further features of at least one embodiment of the present invention include one, but more practically, a plurality of user devices, represented as 60. The user devices 60 are structured and configured to facilitate offline viewing or offline playback of the media content. In particular, offline viewing or offline playback, as used herein, refers to the display of media content on the user device 60 without connection to external network 15. For instance, in some embodiments, during offline viewing or offline media playback, the user devices 60 are not communicatively connected to the network 15. Furthermore, in some embodiments, during offline viewing or offline media playback, the on-site device 30 is also not communicatively connected to the network 15. Accordingly, certain embodiments or implementations of the present invention may be particularly useful or beneficial during private or commercial airline travel where communication to network 15 may be limited or unavailable. It should be noted, however, that the present invention can be implemented in other environments in addition to or instead of private or commercial airline travel.

Figure 1B:
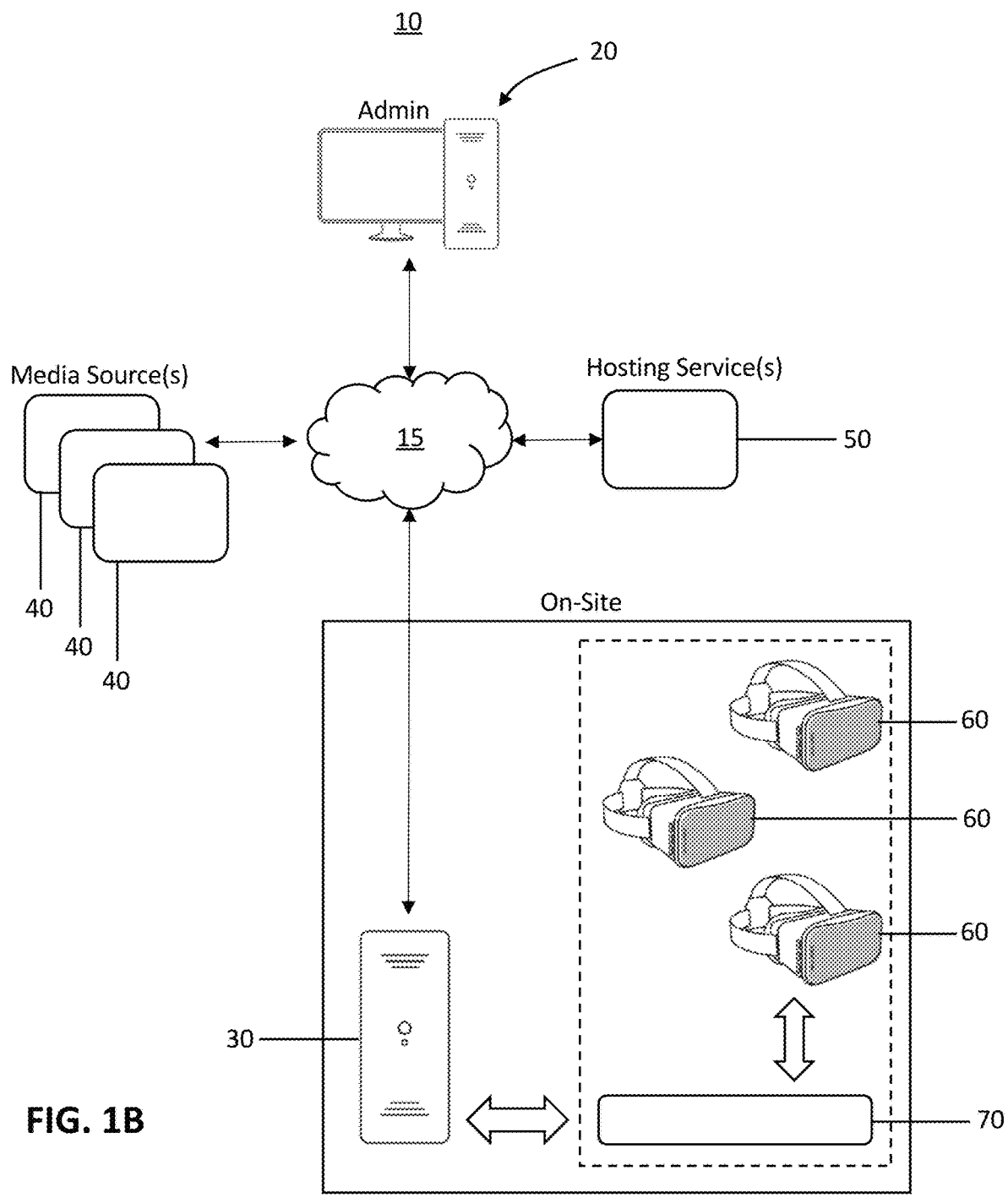
FIG. 1B is a schematic diagram of the system as disclosed in accordance with another embodiment of the present invention.
Figure 1C:
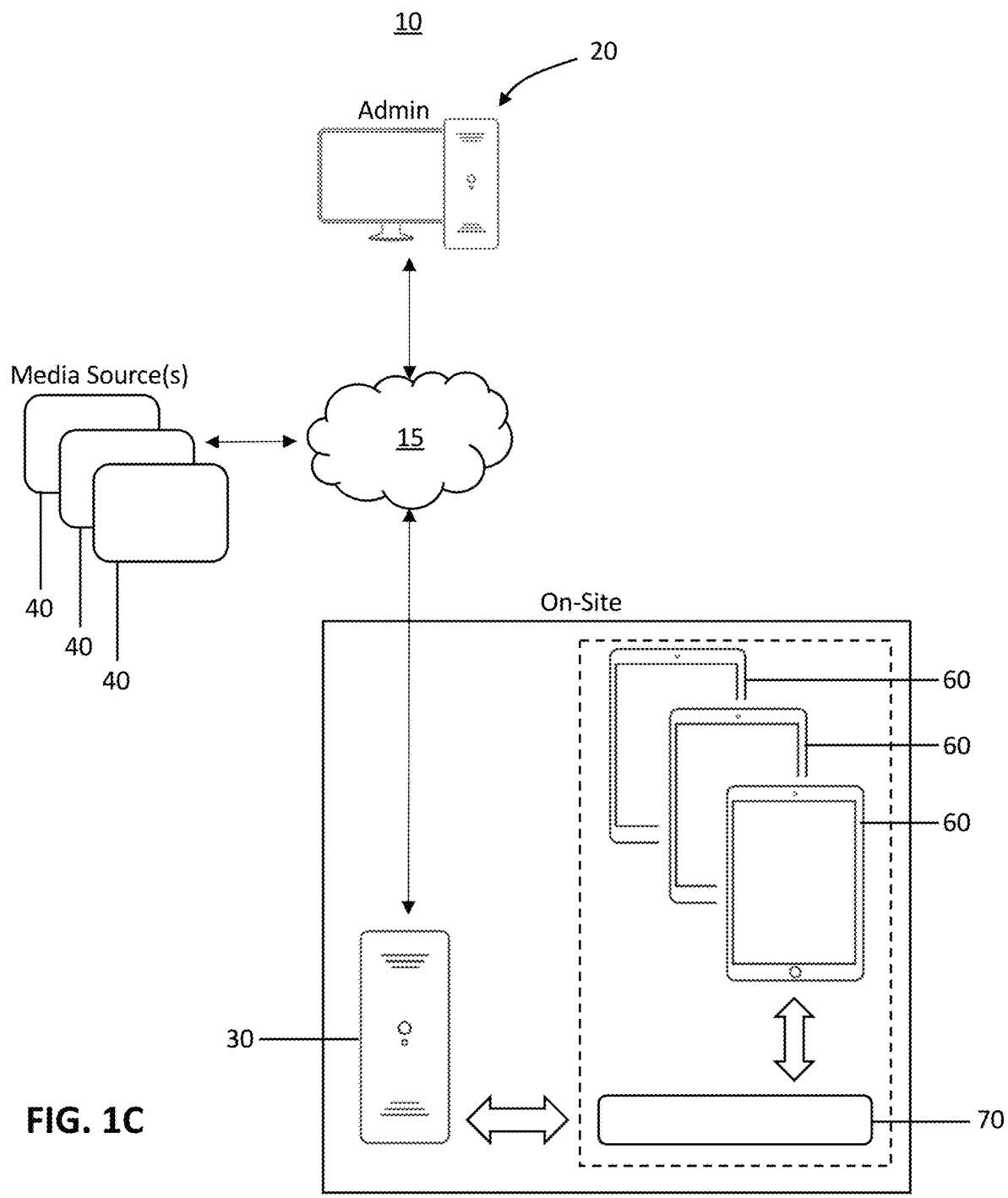
FIG. 1C is a schematic diagram of the system as disclosed in accordance with another embodiment of the present invention.
Figure 1D:
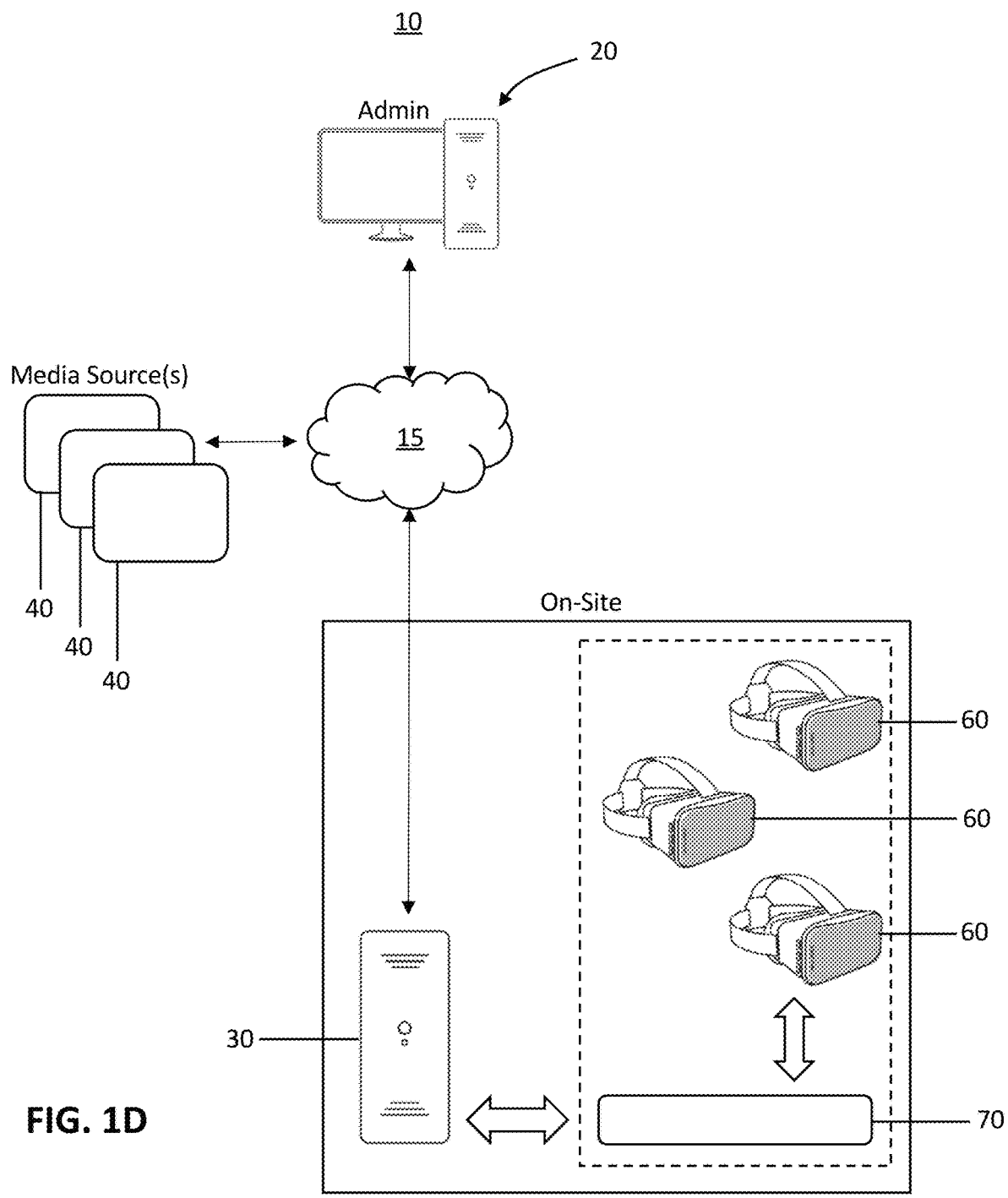
FIG. 1D is a schematic diagram of the system as disclosed in accordance with yet another embodiment of the present invention.

In any event, the user devices 60 of the various embodiments may include mobile devices, such as, but in no way limited to tablet computers (e.g., Apple iPads), as generally illustrated in FIGS. 1A and 1C, and/or virtual reality (VR) headsets or devices (e.g., Oculus Quests), as generally illustrated in FIGS. 1B and 1D. It should be noted that while FIGS. 1A and 1C show tablet computers and FIGS. 1B and 1D show virtual reality headsets, some implementations of the present invention may include a mixture of both tablet computers and virtual reality headsets, or a plurality of different types of user devices, in a single on-site environment.

In other embodiments, for example, the user devices 60 may include mobile or portable phones, mobile or portable gaming systems, laptop computers, desktop computers, projectors, augmented reality devices, etc. In this manner, the user devices 60 of at least one embodiment each include a processor, memory, a data storage device, and one or more communication modules.

Specifically, as used herein, the processor of the user devices 60 includes any device cooperatively structured to execute or implement computer instructions, software, etc., including, for example, the various features and components as described in accordance with at least one embodiment of the present invention, such as video or media playback. The memory device, as used herein, may include but is not limited to random access memory (RAM) or other like devices configured to implement the present invention in the intended manner, for example, by storing and assisting with the execution of one or more applications, modules, or components capable of implementing the features as described herein. In some cases, the processor and memory can be combined to a single microcontroller as is known in the art. Further, the data storage device, as used herein, may include a hard disk drive, solid state drive, virtual drive, could-based storage drive, or other types of volatile or non-volatile memory. It should be noted that non-transitory computer readable media includes all computer-readable media except for a transitory, propagating signal.

Moreover, the system 10 and method 100 of at least one embodiment functions as a proprietary method and service to unify media content from multiple sources and providers 40 into a single remote library capable of syncing with portable entertainment equipment or user devices 60 to provide media playback independent of internet and network connections.

Figure 1E:
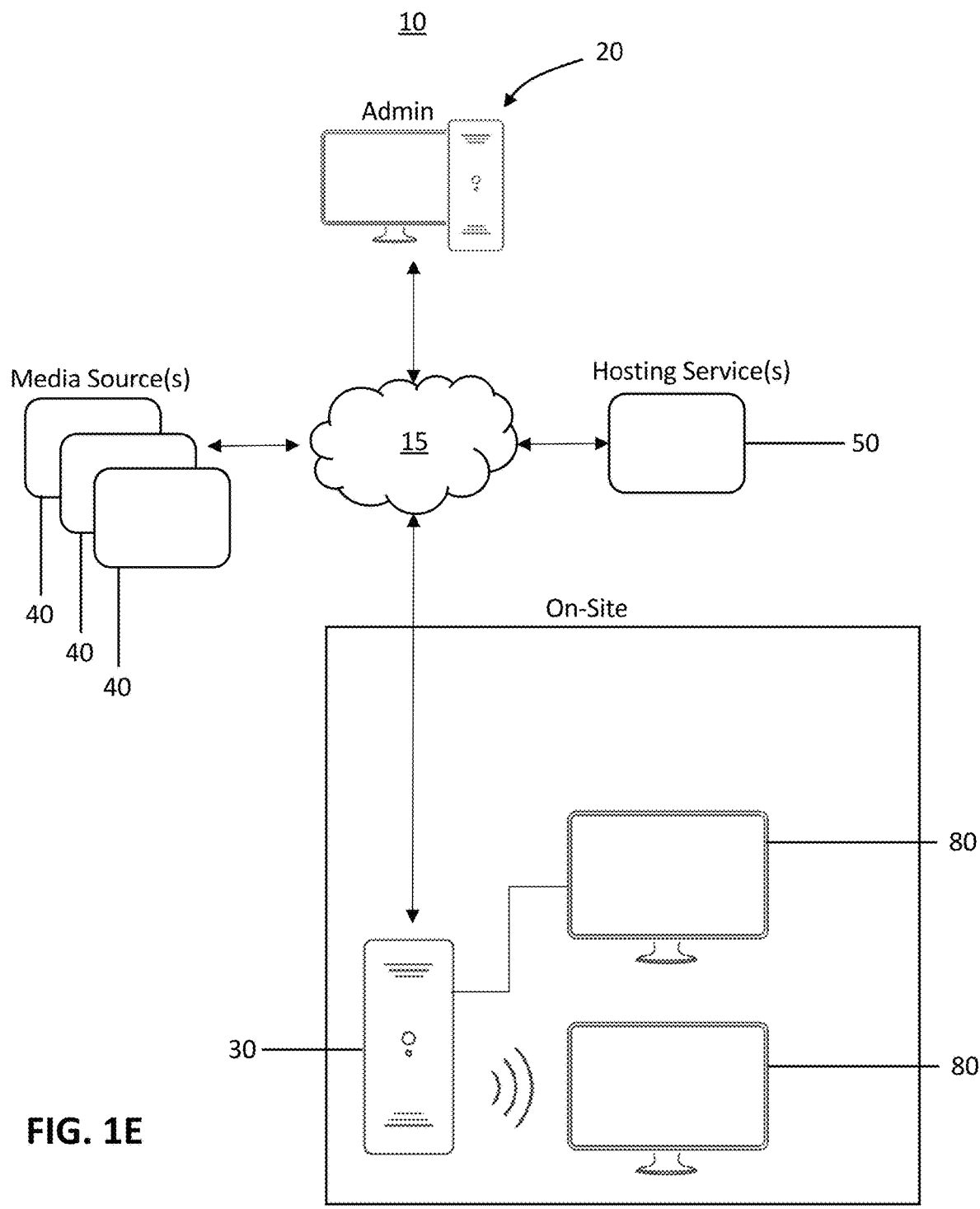
FIG. 1E is a schematic diagram of the system as disclosed in accordance with yet another embodiment of the present invention.
Figure 1F:
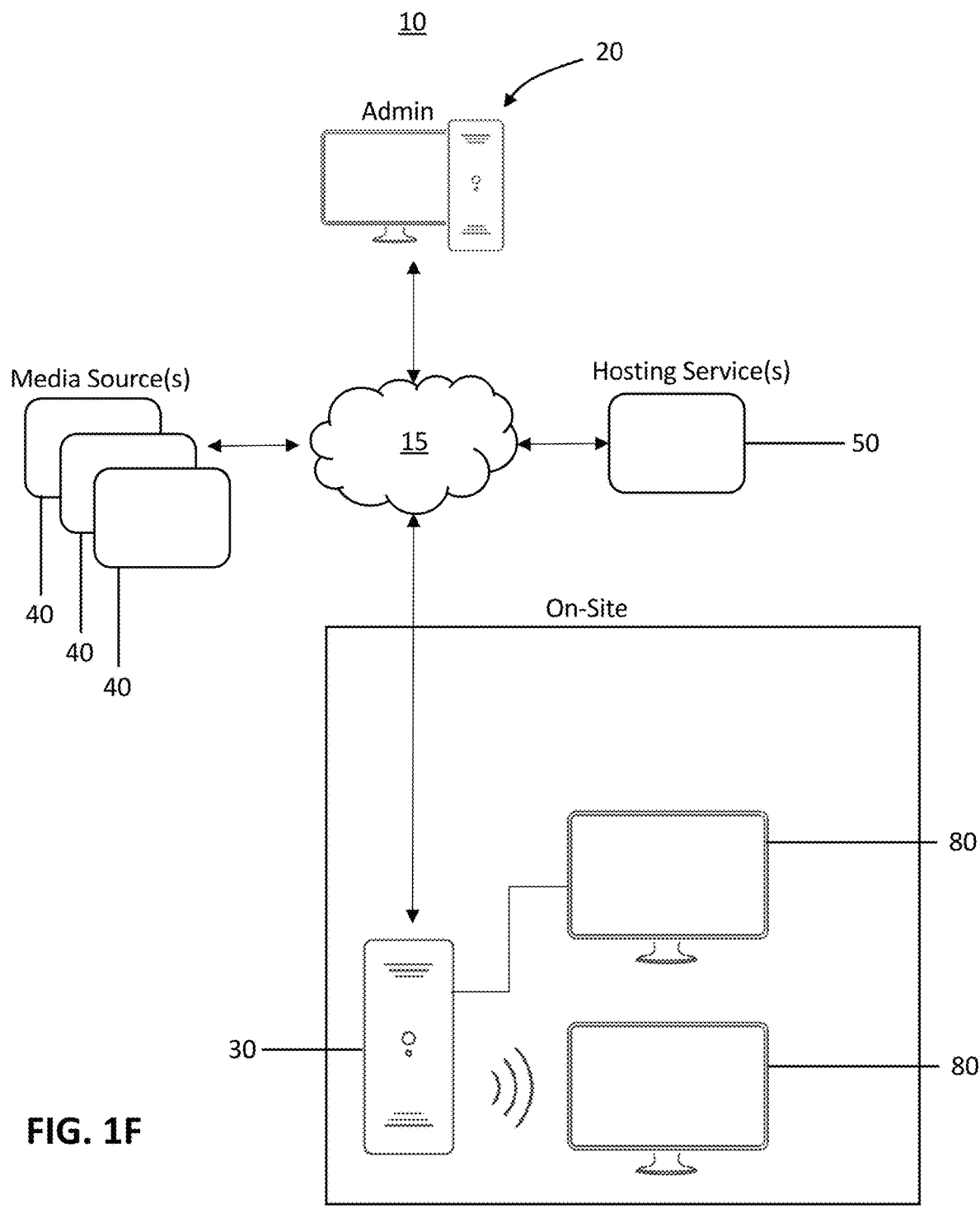
FIG. 1F is a schematic diagram of the system as disclosed in accordance with yet another embodiment of the present invention.

Furthermore, in other embodiments, as illustrated in FIGS. 1E and 1F, the on-site or host device 30 may connect to or communicate with one or more display devices, generally referenced as 80, which may include monitors, televisions, projectors, etc. capable of receiving a video or media stream from the on-site host device 30 and displaying the media thereon. More in particular, the on-site host device 30 may communicate with the one or more display devices via a wired connection, a wireless (e.g., Bluetooth, WiFi, LAN, Zigbee, etc.) connection, or both. For purposes of clarity, while FIGS. 1E and 1F show both wired and a wireless connection capabilities, in some embodiments only one may be present while in other both may be present.

In any event, the device 30 of at least one embodiment may include a local storage device or hard drive to locally store the media, media library and other corresponding files, programs and applications for the intended operation and offline playback of the present invention. As just an example, the local storage device on the on-side host device may be a 4 terabyte (TB) solid-state drive (SSD), although other sizes and other types of drives and storage devices are certainly contemplated within the scope of the present invention.

Furthermore, the device 30 may include various wired connections or ports to accommodate various user/client devices 60, hubs or docking stations 70, and/or display devices 80. As an example, the device 30 may include or support one or more HDMI output connections or port and/or analog RCA output connections or ports. Other connections, ports, etc. are contemplated. In this manner, the on-site host device 30 of at least one embodiment may be configured to support or otherwise communicate with modern entertainment systems, display device 80, etc. (e.g., using HDMI connections) or legacy aviation (or other) entertainment systems that may use RCA or analog communications or connections. In this manner, the host device 30 of at least one embodiment includes one power input and one or more video, media or data outputs in the form of an HDMI output and/or in other cases red, yellow and white RCA composite connections.

Furthermore, the host device 30 of at least one embodiment may be equipped or loaded with software or one or more applications which is/are accessible by the user or client, e.g., via the client device(s) 60 and/or display device(s) 80, for controlling or selecting a desired media playback. More specifically, the software or media player of at least one embodiment runs or is custom Chromium software on a UNIX platform which is configured to synchronize with the client's library located on or managed by the admin system or cloud 20. Various media, such as movies, videos, etc., can be cached or stored, at least temporarily, on the host device 30 for offline viewing. It should be noted and apparent that the Chromium software and UNIX platform are but one exemplary embodiment or implementation and other software or operating systems can be used or implemented within the various embodiments of the present invention.

Furthermore, the software, application(s) or player of at least one embodiment may be configured to remember the usage or playback of the media in order to record in progress and watched media and to track current playback progress for all content. This can be used to remember where the user or client left off when viewing the media. In some embodiments, the playback or usage data and information can be synchronized or communicated back to the cloud, online file syncing service or hosting service 50, or admin system 20 where it is stored and can be later accessed.

In addition, the system and method of certain embodiments of the present invention is configured to support multiple users or multiple playback applications using a single online cloud library. The remote or cloud storage of usage or playback information of at least one embodiment allows the user to continue where he or she left off on a different host device 30.

It should also be noted that the software or playback application(s) 200 run or executed by the host device 30 of at least one embodiment of the present invention can be custom-configured for each user or client and can feature the client's logo(s) 202, as well as other information the client may wish to display. As just an example, in the aviation industry, the client may wish to display aviation tail number graphics or marketing materials on the software or playback application(s) 200 to provide a truly customizable theater experience.

Moreover, the media (e.g., movies, videos, TV or other shows, photographs, animations, etc.) as used in connection with a number of different embodiments of the present invention belongs to or is fully licensed by the client. As an example, the media may be purchased or licensed directly or indirectly from the client's streaming service accounts or platforms 40 (e.g., accounts at or with Netflix, HBO Max, Hulu, iTunes etc.) The media may be converted according to the terms of service of each streaming platform or media service 40 to a format that is compatible with the offline library as disclosed in accordance with the present invention. The media is then uploaded to the cloud library (e.g., stored at an online file syncing service or hosting service 50 and/or an admin system 20) where it will synchronize with the client devices or host device 30 associated with the particular user account. In other words, in at least one embodiment, media licensed to or owned by one client will not synchronize to a host device 30 of another client.

Figure 2A:
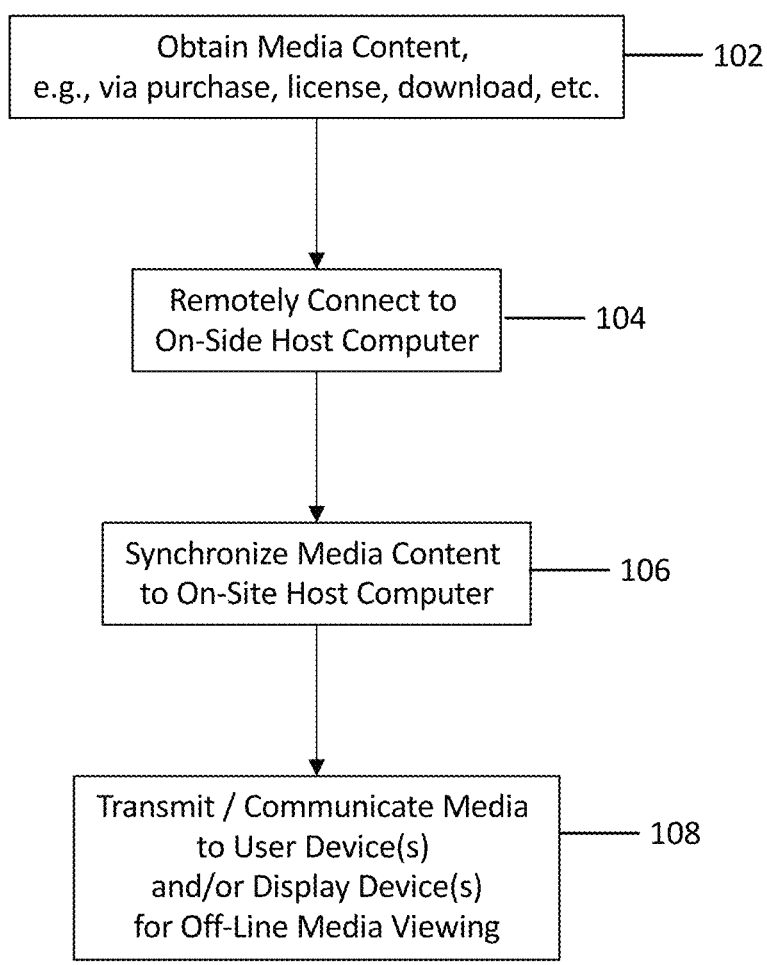
FIG. 2A is a high-level flow chart of the method as disclosed in accordance with at least one embodiment of the present invention.
Figure 2B:
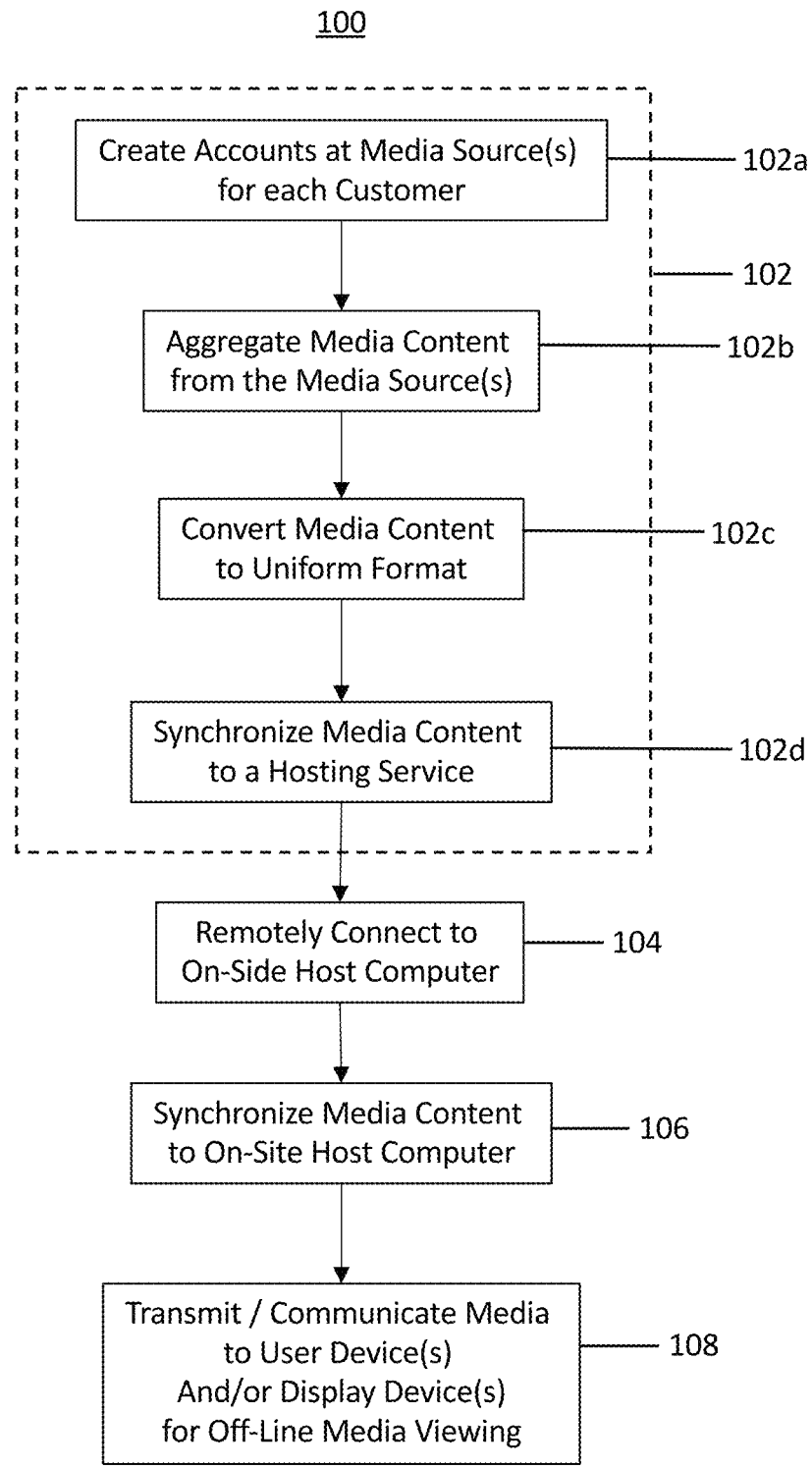
FIG. 2B is a high-level flow chart of the method as disclosed in accordance with another embodiment of the present invention.

Turning to FIGS. 2A and 2B, the method 100 of at least one embodiment of the present invention includes obtaining media content, as represented at 102, that will eventually be available for offline playback on the host device 30, the various user devices 60 and/or connected display devices 80. In one example, obtaining the media content 102 includes creating or accessing accounts 102a for each of the end-users or customers on a plurality of service platforms or media sources 40. In one example, a single user, client or customer may have accounts on a plurality of different service platforms (e.g., Netflix, HBO Max, Hulu, iTunes etc.).

Next, and still referring to FIG. 2A, the method 100 of at least one embodiment further includes aggregating content 102b from these individual sources using the platform-provided delivery methods abiding by all relevant legal terms and conditions. Next, in this exemplary embodiment, the source media is converted 102c into a uniform format to optimize quality, compatibility and file size. The licensed and converted files are then synchronized 102d to an online file syncing service or hosting service 50 (e.g. Dropbox or Google Drive).

It should be noted that in other embodiments, the media content can be obtained 102 in other manners, including, for example, by purchasing the media content, e.g., from a media source or from an owner or licensee of the media content. The purchased media content can then be saved or otherwise stored in digital format on a remote server or storage device, including on a hosting service 50, on the management or administrative device(s) or server(s) 20, or on any other network accessible storage drive.

Once the media content is obtained 102, the media content is transmitted, communicated or synchronized to the on-site device 30. This can be done in a number of different ways. As one example, the management or administrative device 20 can remotely connect 104 to the on-site media host computer 30 that is deployed at an on-site installation using various remote management tools (e.g. TeamViewer, LogMeIn, or RemotePC). Remotely connected to the on-site media host 30, the converted files or media content can be downloaded, imported or synchronized 106 from its storage location to a single media library (e.g. iTunes) on the on-site device 20.

Next, in at least one embodiment, the media content is transmitted or communicated to the user devices 60 or display device 80 for offline playback. This can be accomplished in a number of different manners. In one exemplary embodiment, the on-site device 30 communicates directly with the user device(s) 60, e.g., via a wireless or wired communication, to transmit the media content or media library to the user devices 60. This communication or transmission can occur on periodic intervals, when requested by a user, or randomly. In some cases, the entire media content may be sent to the user device 60 for subsequent viewing, while in other cases, the media content can be streamed from the on-site device 30 to the user devices 60. In many cases, however, the user devices 60 are capable of providing offline playback of the media content independent of the on-site host computer or device 30 and independent of the internet or other network 15 connection.

In other embodiments, the present invention includes a docking station 70 to which the user devices 60 can be docked or connected, either physically via cooperative ports or connections, wirelessly, wired, etc. In one implementation, the on-site device 30 communicates with the docking station 70, which in turn communicates with the docked user devices 60, in order to transmit or communicate the media content to the user devices 60.

For instance, a fleet of user devices, including but not limited to tablet devices (e.g. Apple iPads), as shown in the embodiments of FIGS. 1A and 1C, and/or virtual reality headsets (e.g. Oculus Quests), as shown in the embodiments of FIGS. 1B and 1D, are maintained or located on-site and are routinely docked in a custom charging and syncing apparatus 70 connected to the on-site media host 20.

Furthermore, as an example, to provide high quality responsiveness and functionality, a standard charging cabinet may be upgraded to support USB 3.0 high speed charging and syncing by removing the original surge protectors and installing multiple USB 3.0 hubs and appropriate high speed sync cables. When the user devices 60, e.g., tablets and/or virtual reality headsets, are connected to the dock 70, the latest unified media library content or media content can be synced from the media host computer 30 to the user devices 60. This stored media library or media content provides content playback independent of internet or network connection.

Further features of at least one embodiment of the present invention include a custom online portal where clients, customers and users are able to quickly and easily share their media preferences, allowing the system and method to rapidly curate and sync media on an individual basis for every device in a client's fleet. In the most basic form, the online portal surveys client preferences among cinematic genres, but it also provides sections to query specific movies, TV shows, music, periodicals, trending content, and special requests from which the system extrapolates their broader viewing preferences and generates a user preference profile. The results of these preferences and requests have been programmed to immediately update the client's profile.

The mobile tablet devices (e.g. Apple iPad Pro 12.9") of at least one embodiment are configured to provide the highest quality viewing experience in environments of dynamic travel and are regularly synced with the latest available content according to their defined media preferences. The initial device configuration includes, at minimum, (1) a specific legacy version of the tablet operating system that provides the most user-friendly interface for offline media playback (e.g. iOS 12), (2) a set of wireless noise-cancelling audiophile-quality headphones (e.g. Bose QuietComfort 35), and (3) a specially modified Apple Magic Keyboard case. The standard version of this case has been selected as a base platform due to its ergonomic flexibility of screen viewing angles and its durable construction which can withstand harsh travel environments, including potentially turbulent air travel. A modified version of this tablet case can be used to minimize the visual clutter by covering the unnecessary trackpad and keyboard inputs with a thin vinyl wrapped plastic sheet, provide two surface areas for custom client branding with vinyl graphics, and retain the elegant form and function of the latest-generation floating cantilever screen design. These modifications simplify the learning-curve for new users, provide additional branding opportunities for our clients, and enhance the overall cinematic experience.

The virtual reality experience, of yet another embodiment or implementation, utilizes self-contained virtual reality headsets that do not require an external PC (e.g. Oculus Quest 128 GB) that are customized to suit the client needs. The standard headset modifications include, for example, (1) the application of developer-specific settings to prevent cumbersome play-area boundary configuration in the controlled environment, (2) the substitution of a simplified remote control interface, (3) the integration of elements to improve the audio quality and volume, (4) a custom face mask fitment from a selection of varying shapes, sizes, and materials (e.g. silicone, foam, leather, vinyl, etc.), and (5) custom branding according to client requests. These modifications improve the overall virtual reality experience by addressing and minimizing or eliminating a steep learning curve for new users, counterintuitive user controls, sub-par audio quality compared to other high end entertainment solutions, and less-than-ideal facial comfort over periods of prolonged usage. Furthermore, additional branding opportunities are provided with the headsets similar to our process of tablet customization.

An exemplary system of at least one embodiment or implementation of the present invention includes: (1) an on-site host computer 30 (e.g. Apple MacBook Pro) that maintains the media library and manages synchronizing services for additional client devices 60, (2) a remote off-site administrator computer 20 (e.g. any commercially available computer) that has an internet connection used to connect and remotely update the on-site host media library, (3) a fleet of client devices 60 that provide media playback in an environment without internet (e.g. Apple iPad Pro 12.9"), (4) a fleet of client virtual reality self-contained headsets 60 (e.g. Oculus Quest 128 GB), (5) equipment and accessories for the fleet of client devices (e.g. Bose QuietComfort 35 headphones, a modified Apple Magic Keyboard case complete with custom vinyl graphics, simplified VR remote control, improved VR headset facial mask, improved VR speaker system), (6) physical hardware to dock and sync the device fleet to the on-site computer (e.g. LocknCharge Carrier 10 charging dock modified with Anker USB 3.0 hubs installed to support syncing), and (7) various software packages that (a) manage the host library and edit metadata (e.g. iTunes), (b) provide access to media sources and providers (e.g. PlayOn), (c) convert between supported formats, (d) remotely connect to the on-site computer (e.g. TeamViewer), (e) sync the client devices (e.g. iTunes), (f) display a tablet user interface optimized for offline media playback (e.g. iOS 12), (g) administer the online portal survey questionnaire (e.g. WordPress website with a custom-designed client media survey plugin).

In other embodiments, the host computer 30 may include a nano-computer (e.g., powered by or including Raspberry Pi or other similar computing device) and may include software or application(s) which are capable of browsing the media library and playing the media content, among other features. In such a case, the host device 30 may include one or more video-out connections, either wired or wireless, which can then communicate with a display device, e.g., a monitor or a video projector, or a user device such as a tablet, VR headset or other computer device. As provided herein, in at least one embodiment, the host device 30 includes one or more HDMI output ports, analog (e.g., RCA video ports), or other video or data ports or connections to facilitate the practice of the present invention in the intended manner.

Furthermore, in some embodiments, the host computer or device 30 may include or be equipped with a mobile hotspot which can cast a wireless network to which other devices can connect. In other words, the mobile hotspot or integrated network connectivity of at least one embodiment may allow the host device 30 to broadcast or create its own local or wide area network and/or to provide nearby devices the ability to connect to the Internet or other network, for example, via 3G, 4G or 5G telecommunication networks.

The mobile hotspot or integrated network connectivity of the host device of at least one embodiment of the present invention can also facilitate remote access such that media (and other) content can be pushed or synchronized to the device 30. As an example, when the device 30 obtains a connection, e.g., with a nearby WiFi connection, a telecommunication network connection such as 3G, 4G or 5G connection, or other network connection) via the network connection capabilities of the host device, the system and method of at least one embodiment of the present invention can be configured to automatically or manually synchronize media content as described herein. For instance, again in the aviation industry, if the device 30 is disposed on an airplane, when the airplane lands or approaches a location where network connectivity is available, the device 30 may connect to the network and update or synchronize with new content.

Figure 3A:
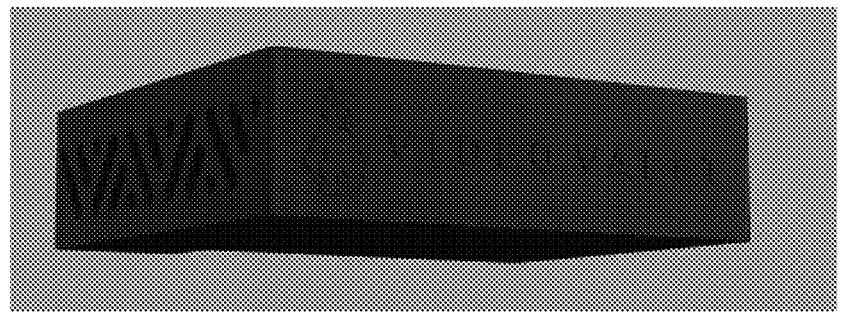
FIG. 3A is an exemplary drawing of the on-site computing device as disclosed in accordance with at least one embodiment of the present invention.
Figure 3B:
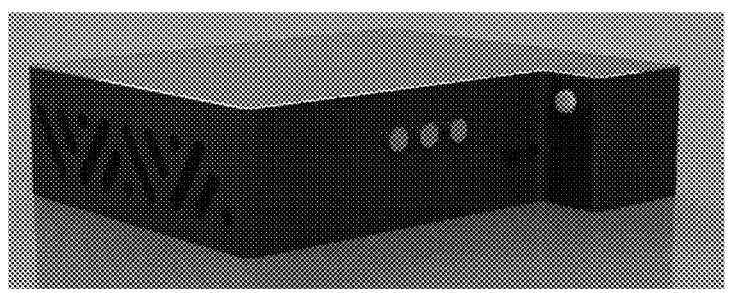
FIG. 3B is an exemplary drawing of the on-site computing device as disclosed in accordance with at least one embodiment of the present invention.
Figure 3C:
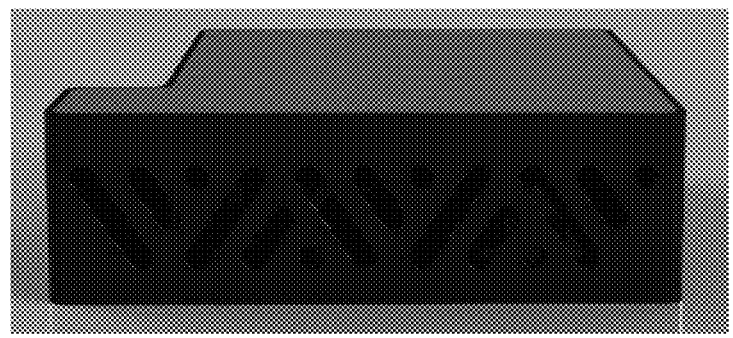
FIG. 3C is an exemplary drawing of the on-site computing device as disclosed in accordance with at least one embodiment of the present invention.

FIGS. 3A through 3C illustrate an exemplary embodiment of the stand-alone synchronizing host device 30 that outputs video and other content to a connected monitor, display device or computing device via a wired or wireless communication connection as disclosed in accordance with at least one embodiment of the present invention.

Figure 4:
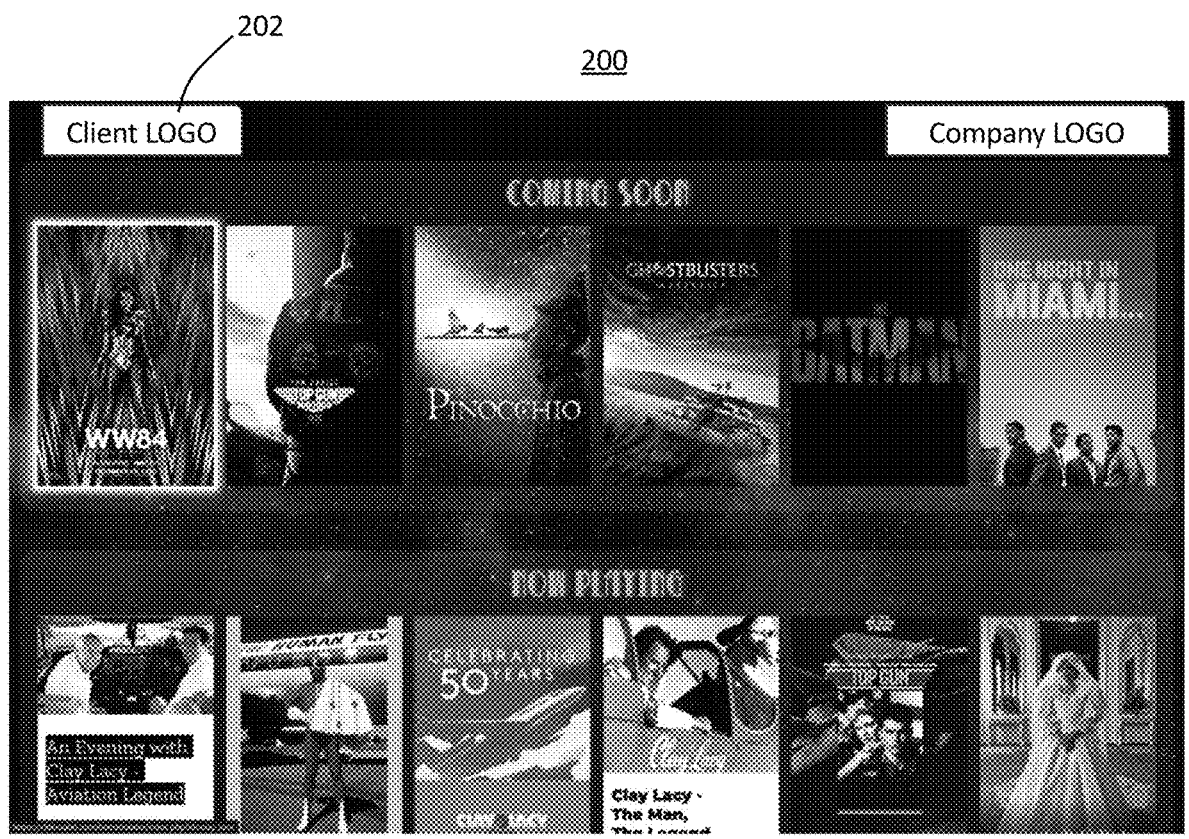
FIG. 4 is an exemplary screenshot of a user interface as disclosed in accordance with at least one embodiment of the present invention.

In addition, as disclosed herein, some embodiments include an interface, generally represented as 200 in FIG. 4, where a user or client is able to select which media to play or which media to synchronize with the corresponding host device 30. For example, the interface may be accessible via the host device 30 where the user or client is able to select media that has already been synchronized thereto. In other cases, the interface or a similar interface may be accessed to select which media the client would like to have synchronized to the host device 30. In such a case the interface may communicate with or otherwise display content that is available across one or more media sources 40 which the user can then select or identify, and which will then be synchronized to the host device in accordance with the various embodiments described herein.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention. This written description provides an illustrative explanation and/or account of the present invention. It may be possible to deliver equivalent benefits using variations of the specific embodiments, without departing from the inventive concept. This description and these drawings, therefore, are to be regarded as illustrative and not restrictive.

Now that the invention has been described,

What is claimed is:

1. A system for facilitating offline media playback, said system comprising:
   an administrative computing device disposed in a communicative relation with a data network, said administrative computing device comprising a processor, memory and a storage device,
   an on-site computing device at least temporarily disposed in a communicative relation with the data network, said on-site computing device comprising a processor, memory and a storage device,
   a plurality of local content display devices and an on-site docking station, wherein said plurality of local content display devices are selectively docked and communicatively connected to said on-site docking station,
   an online portal configured to receive user preferences corresponding to media content and, based thereupon, to generate a user preference profile,
   wherein said administrative computing device is configured to facilitate synchronization of a plurality of media content files to said on-site computing device via the data network where said plurality of media content files are locally stored, the plurality of media content files being selected based upon said user preference profile,
   wherein said plurality of media content files are obtained by at least two different media subscription sources, wherein, at least at the time of obtaining each of the plurality of media content files, a client has an active paid subscription with the corresponding media subscription source from which the media content files are obtained,
   wherein each of said media content files are downloaded from a corresponding one of the plurality of media subscription sources and saved at a network-accessible hosting service, said network-accessible hosting service being independent of said plurality of media subscription sources,
   wherein, each of said media content files from said at least two different media subscription sources are aggregated and converted into a uniform file format, wherein said administrative computing device is configured to remotely log into said on-site computing device to synchronize said media content files from said network-accessible hosting service to said on-site computing device, and wherein said plurality of local content display devices are selectively docked and communicatively connected to said on-site docking station, said media content files are transmitted to the plurality of local content display devices for independent offline viewing.

2. The system as recited in claim 1 wherein said media content files are associated with a user account corresponding to the client.

3. The system as recited in claim 2 wherein the media content files are only synchronized with an on-site computing device associated with the client.

4. The system as recited in claim 1 wherein said plurality of local content display devices comprise computing devices communicative with said on-site computing device for providing offline streaming of said plurality of media content files.

5. The system as recited in claim 4 wherein at least one of said plurality of local content display devices comprises a tablet computer.

6. The system as recited in claim 4 wherein at least one of said plurality of local content display devices comprises a virtual reality headset.

7. The system as recited in claim 4 wherein at least one of said plurality of local content display devices comprises a display monitor.

8. A method for facilitating offline media playback of media content from a plurality of media subscription sources, the method comprising:

defining a user preference profile based upon information received by a user via an online portal, using at least one first processor at an administrative computing device, selecting media content based on the user preference profile from a plurality of media subscription sources, wherein, at least at the time of obtaining the media content, a client has an active paid subscription with the corresponding media subscription source from which the media content file is obtained, using the at least one first processor, downloading a plurality of media content files corresponding to the media content selected from the plurality of media subscription sources, saving the plurality of media content files at a network-accessible hosting service, the network-accessible hosting service being separate from said plurality of media subscription sources, aggregating the plurality of media content files to a media library and converting the plurality of media content files to a uniform file format, using the at least one first processor at the administrative computing device, remotely connecting to an on-site computing device and, through the remote connection, synchronizing the plurality of media content files from the network-accessible hosting service to the on-site computing device for storage thereon, selectively docking a plurality of local content display device to an on-site docking station, and transmitting the media content from the on-site computing device to the plurality of local content storage devices docked to the on-site docking station for independent offline viewing.

9. The method as recited in claim 8 wherein the media content is associated with a user account corresponding to the client.

10. The method as recited in claim 9 wherein the media content is only synchronized with an on-site computing device associated with the client.

11. The method as recited in claim 8 wherein the plurality of local content display devices comprise computing devices communicative with said on-site computing device for providing offline streaming of said media content.

12. The method as recited in claim 11 wherein at least one of said plurality of local content display devices comprises a tablet computer.

13. The method as recited in claim 11 wherein at least one of said plurality of local content display devices comprises a virtual reality headset.

14. The method as recited in claim 11 wherein at least one of said plurality of local content display devices comprises a display monitor.

* * * * *